(12) United States Patent
Meller et al.

(10) Patent No.: US 9,571,156 B2
(45) Date of Patent: Feb. 14, 2017

(54) BURST TRIGGERED SIGNAL ANALYSIS

(71) Applicant: CISCO TECHNOLOGY, INC., San Jose, CA (US)

(72) Inventors: Rick Meller, Sunnyvale, CA (US); Glendon Leo Akins, III, Fort Collins, CO (US)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 13/828,609

(22) Filed: Mar. 14, 2013

(65) Prior Publication Data

US 2014/0269867 A1     Sep. 18, 2014

(51) Int. Cl.
    *H04B 3/46*     (2015.01)
(52) U.S. Cl.
    CPC ........................ *H04B 3/46* (2013.01)
(58) Field of Classification Search
    CPC ........................................................ H04B 3/60
    USPC ..... 702/56, 60, 68, 69, 70, 71, 183; 324/620
    See application file for complete search history.

(56) References Cited

U.S. PATENT DOCUMENTS

| | | | |
|---|---|---|---|
| 6,151,559 A * | 11/2000 | Williams | H04N 17/00 348/E17.001 |
| 6,344,749 B1* | 2/2002 | Williams | H05K 9/0069 324/620 |
| 6,798,854 B2 | 9/2004 | Kolze et al. | |
| 7,334,253 B2 | 2/2008 | Howard | |
| 2003/0210749 A1 | 11/2003 | Asjadi | |
| 2007/0118317 A1 | 5/2007 | Corredoura | |
| 2009/0082982 A1 | 3/2009 | Cain | |
| 2010/0228508 A1* | 9/2010 | Smith | G01R 13/0254 702/68 |

FOREIGN PATENT DOCUMENTS

WO    WO 2008/094082 A1    8/2008

* cited by examiner

*Primary Examiner* — Alexander Satanovsky
*Assistant Examiner* — Felix Suarez
(74) *Attorney, Agent, or Firm* — Merchant & Gould P.C.

(57) ABSTRACT

An apparatus can include a detector configured to detect a burst event for a selected frequency of a digital input signal having a predetermined bandwidth. The detector can provide a burst trigger, in response to detecting the burst event relative to a threshold, and provide other burst data for the detected burst event. A signal analyzer can be configured to measure signal information for another selected frequency of the digital input signal in response to the burst trigger. The signal analyzer can provide corresponding analysis data based on the measured signal information, the burst trigger, the other burst data, and the corresponding analysis data can be stored in memory.

20 Claims, 4 Drawing Sheets

BURST TRIGGERED SIGNAL ANALYSIS

TECHNICAL FIELD

This disclosure relates to triggering signal analysis based on burst noise.

BACKGROUND

Signal analysis is performed to extract useful information that is carried by an electrical signal. This information can include parameters, such as amplitude, magnitude, frequency, power and power spectrum, distortion, harmonics and the like. Signal analyzers can be used in a variety of circumstances to measure signal parameters as to characterize transmitters and the transmission path along which the signal propagates. As an example, a receiver in a cable modem termination system (CMTS) head end can receive signals from one or more cable modems along a reverse path. The reverse path signals are subject to hybrid fiber-coaxial (HFC) impulse burst noise impairments due to external factors, such as electric motors, welders, switching events in the power mains and the like. The funneling nature of the reverse path in the HFC plant can further exacerbate these factors at the CMTS receiver.

DESCRIPTION OF EXAMPLE EMBODIMENTS

Overview

This disclosure relates to triggering signal analysis based on burst events, such as in response detecting burst noise that occurs within a selected narrowband region of an input signal spectrum. In addition to generating a trigger, other associated time domain burst data (e.g., burst statistics, such as the number of burst events and duration) can also be provided for a detected burst event. The trigger and associated burst data can be generated based on a comparison of power characteristics for the narrowband region relative to a threshold, which may be programmable. The burst detection cooperates with signal analysis to provide a combination of time domain and frequency domain information that can be time correlated with a detected burst event. For example, the signal analysis can implement a flexible fast Fourier transform (FFT) engine to analyze another selected frequency region of the input signal in response to the trigger. The FFT engine can implement selectable BIN numbers such as can be configured according to the burst duration characteristics, for example.

In some examples, the burst event triggering can be implemented in a CMTS of cable head end or hub to characterize (e.g., diagnose) in a reverse signal path to facilitate analysis and processing of time-correlated burst event information and spectral analysis data. This further can allow the temporal and frequency domain data to be accumulated and analyzed to derive an appropriate strategy to help maximize usage of bandwidth in the reverse signal path.

Example Embodiments

Figure 1:
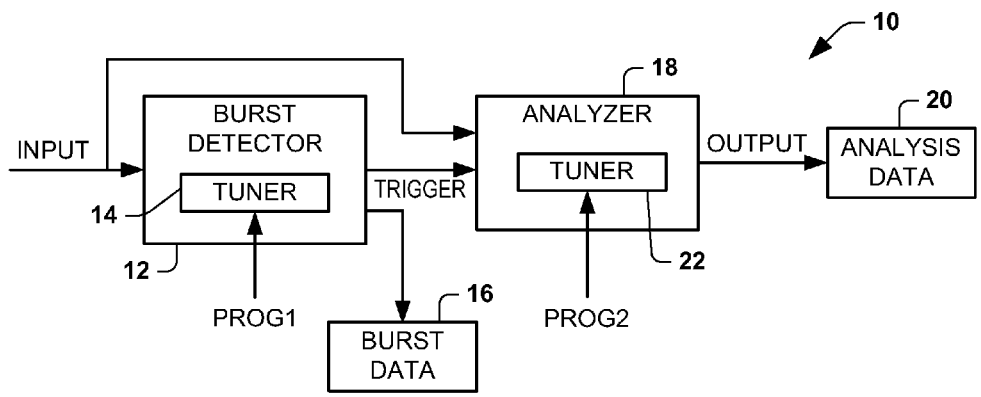
FIG. 1 depicts an example of a system to trigger signal analysis.

FIG. 1 depicts an example of a system 10 to trigger signal analysis based on burst noise. The system provides a temporal and frequency domain view of signal characteristics. The system 10 includes a burst detector 12 that is configured to detect a burst event from a digital input signal. In some examples, the input signal can be a digital baseband signal such as an upstream signal according to one of the Data Over Cable Service Interface Specification (DOCSIS) standards. For example, the input signal can include signals transmitted from one or more cable modems, such as may be provided by in a spectrum ranging from about 5 MHz to about 85 MHz. As a result, the input signals received by the system 10 can be subject to hybrid fiber-coaxial (HFC) impulse burst noise impairments due to external factors, such as electric motors, welders, switching events in the power mains and the like. The burst event thus can correspond to burst (e.g., impulse) noise in any part of the signal spectrum as well as DC noise. This impulse burst noise tends to be dynamic as opposed to stationary, and does not exhibit a constant power spectral density (PSD). Instead, the PSD of burst noise tends to varyingly decrease as a function of frequency.

The burst detector 12 includes a tuner 14 that can be programmed to tune to a selected frequency (e.g., including a portion of the spectrum). For example, the tuner can convert the digital signal based on program data (demonstrated as PROG1) such as can be stored in memory. For example, the PROG1 signal can identify one or more of a channel and frequencies to which the tuner 14 can tune, such as based on signal interference or noise information (e.g., signal-to-noise ratio (SNR), bit error rate (BER)) that can be determined by associated monitoring components. In some examples, the tuner 14 can be implemented as including a digital down converter, such as can include a CORDIC based derotator and a decimation filter. As such, the tuner 14 can convert a selected narrow band region of the input signal spectrum to a lower sampling rate.

The burst detector 12 can provide a trigger signal on burst events detected in the selected narrow band. As an example, the burst detector can be configured to calculate power in the selected narrow band and provide the trigger signal in response to the power crossing a programmable threshold. For instance, a hysteresis comparator can compare the power to respective high and low thresholds, such that crossing the thresholds provide the trigger signal having corresponding logic level. The thresholds can be programmable. In some examples, the burst detector 12 can employ narrowband filtering that is tuned to a portion of the spectrum expected to have low background noise. In response to detecting that background noise in the narrowband region is abnormally high, however, the thresholds can be programmed to a higher threshold than normal. For example, the background noise level can be measured and stored in a register that is read by a processor or other logic to set the threshold according to the background noise level.

In addition to the trigger signal, the burst detector 12 can also generate other burst data 16. The other burst data 16 can include information (e.g., burst event statistics) describing one or more burst events, such as including the number of burst events and the duration of one or more burst events during the sample period. For example, the burst detector 12 can include a counter to track the number of burst events over a time period. The burst detector 12 can also include at timer to monitor duration of one or more of such burst events.

An analyzer 18 can analyze the input signal in response to the trigger signal and provide corresponding analysis data 20. The analyzer 18 can be configured as a spectral analyzer that can perform spectral analysis data for a selected region of the input signal spectrum. The region can be selected by a tuner 22, such as can be implemented as a CORDIC derotator and a decimation filter, for example. The tuner 22 can be programmable to tune to selected region of the input signal spectrum based on program data, demonstrated as PROG2. The region selected for analysis can be the same frequency that is selected and in which the burst is detected by the burst detector 12. In other examples the selected region can correspond to a frequency that is different than the frequency selected for burst detection.

As a further example, the signal analyzer can be implemented as a flexible fast Fourier transform (FFT) engine that is enabled by the trigger signal. In some examples, the FFT engine can be enabled by a variety of other different triggers as to provide a multi-function FFT engine. The FFT engine can include a programmable zoom capable of zooming in on a selected region of the spectrum at a plurality of different zoom levels. The FFT engine can operate to maintain the same bin spacing for each of the different zoom levels. Moreover, the number of bins can be dynamically set based on the burst data 16, such as according to the duration of a given burst event. Additionally, the FFT engine can employ variable prebuffer to ensure that the analysis is performed temporally commensurate with the detect burst event based on the trigger signal. Windowing can be performed on the output of the core FFT for shifting and scaling the spectral data computed by the FFT.

The analysis data 20 can include a measurement of power spectral density (PSD) characteristics for a specified narrow band region. The analysis data 20 can be time correlated with the burst data 16 according to a common time base, such as a clock of a receiver that implements the system 10. As a result, the system 10 can provide both a time domain and frequency domain view for burst noise events.

Figure 2:
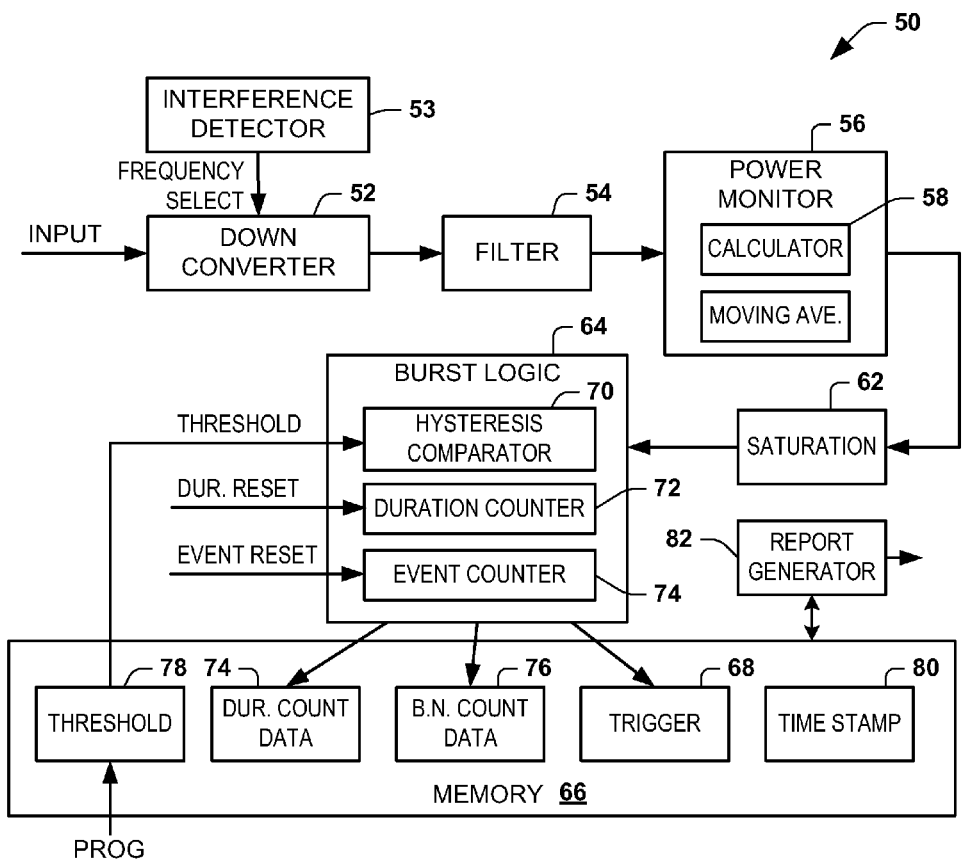
FIG. 2 depicts an example of a burst noise detector.

FIG. 2 depicts an example of a burst detector 50 configured to detect burst noise at a selected frequency in a signal spectrum. The detector 50 can include a down converter 52, such as can implement a CORDIC algorithm. Other means for implementing down conversion can be employed, such as the use of multipliers. The down converter 52 can convert the input signal to a down converted signal centered at a selected frequency, which can be programmable based on a frequency select input. The frequency select can be set by a controller, such as by storing the frequency selection value in a register or other memory device.

By way of example, the controller (or other device) can be configured as an interference monitor 53 to determine and identify an impaired channel in the input signal. In some examples, the interference monitor 53 can include a receiver (e.g., in a CMTS) can include a FFT configured to detect and remove channel impairments from the input signal spectrum. The receiver and FFT can run continuously to scan every channel that is in use and identify noise (e.g., interfering frequencies) across the spectrum for each channel, for example. The interference monitor 53 further can analyze the identified noise and further narrow the noise to a relatively narrow band frequency region (e.g., to about a 5 KHz region in a 5 MHz channel). The interference monitor 53 can specify a set of channels and frequencies within such set of channels that are impaired, which can be provided in the frequency select input to enable initial tuning of the down converter 52 to frequencies of interest. In other examples, the interference monitor 53 can be configured to provide the frequency select signal based on BER and/or SNR.

A decimation filter 54 can filter out undesired portions of the input spectrum to enable burst noise detection in a narrow band of interest. The resulting narrowband region of the input spectrum can be provided to a power monitor 56. The power monitor 56 can be configured to measure power in the narrowband spectrum provided by the decimation filter. The power monitor 56 can provide an indication of power for the selected spectral region of the input signal. In the example of FIG. 2, the power monitor 56 includes a power function 58 configured to implement one or more mathematical functions on the narrowband region of the input signal to calculate an indication of power in the narrowband output signal provided by the decimation filter 54. For example, the power function can perform a squaring function on the narrow band spectrum, such as to square the complex magnitude (e.g., corresponding to $\sqrt{r^2+i^2}$, where r denotes the real component and i denotes the imaginary component) of the narrowband spectrum. The squaring function of the power function 58 thus can be utilized to compute a corresponding complex magnitude of the narrowband input signal that is functionally related to power of the narrowband region of the signal.

A moving average block 60 can be configured to compute a moving average of the narrow band spectral power calculated by the function 58. For example, the moving average block can be implemented as an impulse response (IR) filter with programmable decay rates. The decay rates can vary based on changes with background noise and impulse burst noise, for example. The power monitor 56 can provide an indication of the measured power (e.g., a time averaged power measurement) to a saturation block 62.

The saturation block 62 can be configured to control the range of the output power for the narrow bound signal provided by the power monitor 56. The saturation block can be programmable. Alternatively, programmable gain blocks can be utilized to control and normalize the input power to facilitate burst noise detection. In some examples, the saturation block 62 can quantize the power measure signal and keep it within predetermined upper and lower bounds of a register in which the power measure signal is stored. In other examples, the saturation block 62 can be omitted provided a sufficiently large register were utilized to store the power measure provided by the power monitor 56.

The output of the saturation block 62 (e.g., stored in a corresponding register) can be utilized by burst logic 64. The burst logic 64 can be configured to determine statistics associated with the burst noise. As used herein in the context of burst noise, the term statistics can encompass any information that can characterize the burst noise such as when it occurs, how long it occurs, how many times it occurs as well as absolute and mean values thereof. Other forms of statistics and combinations thereof can also be utilized to provide a corresponding time domain representation of burst noise information for the selected narrowband region. The burst logic 64 can store burst noise statistics as burst data in memory 66, such as a register or other memory device. For example, other devices and processes (e.g., by a controller or processor) operating in a communication system can access the burst data in the memory 66 for performing diagnostics or other control functions. In some examples, the burst data can be utilized to set one or more parameters of the burst detector 50, such selecting the frequency (e.g., of the cordic derotator), programming filter characteristics (e.g., of the filter 54), setting a threshold (e.g., for controlling the burst logic 64) or the like.

The burst logic 64 can be configured to provide a trigger output 68 to enable or disable operation of the signal analyzer (e.g., analyzer 18 of FIG. 1 or signal analyzer 100 of FIG. 3) based on the trigger. In the example of FIG. 2, the burst logic 64 includes a hysteresis comparator block 70 that is configured to provide the trigger output 68. The trigger output 68 can be provided to a bus or other output for controlling the signal analyzer as disclosed herein. The trigger output 68 can also be stored in the memory 66 for subsequent analysis. The current trigger output 68 in the register can also provide the trigger input to the signal analyzer.

The hysteresis comparator block 70 can be configured to perform a compare function between the output of the saturation block 62 relative to a corresponding threshold. For example, the threshold can include programmable high and low thresholds to which the output of the saturation block is compared to ascertain whether the respective power level is indicative of a burst noise condition or a non-burst noise condition. The results of such comparison can be encoded in the trigger output 68. For instance, the trigger output can be a digital logic signal (e.g., one or more bits of 0 or 1) to indicate if a burst event is detected. Each of the respective high and low thresholds can be programmable to selectively control what burst noise power levels will result in triggering the signal analysis. Data representing the values of each burst noise thresholds used for detecting a given burst noise event can also be stored in the memory 66 to facilitate subsequent analysis of data captured for the given burst noise event. In some examples, timestamp data 80 can also be stored in the memory 66 to indicate the beginning and/or end of a given detected burst noise trigger event.

The burst logic 64 can also include a duration counter 72 that is configured to generate duration count data 74 that indicates the duration of a given triggered event. As an example, the duration counter 72 can be implemented as a timer or count circuit that can be set to track the time between the beginning and end of a respective burst noise event. The duration counter 72 can operate relative to a local time base, such as a system clock (e.g., implemented in a receiver). The duration counter 72 can be reset in response to a duration reset input, such as can be responsive to the trigger output 68 changing from a first logic level indicating the occurrence of a given burst noise event to another logic level indicating the non-occurrence of the given burst noise event. As an example, the duration count output 74 can correspond to a total number of clock cycles spanning between the beginning and end of a given burst noise event. As another example, the duration counter 72 can track a running count value based on the trigger output 68 indicating the occurrence of a burst noise event. In such example, the duration count data 74 for a given burst noise event can include a beginning count value at the beginning of the given event and an ending count value at the end of the given event. The duration can be determined based on the difference between the end and the beginning count values.

In some examples the counter 72 can increment for each clock cycle (or for a predetermined number of clock cycles) while enabled by the trigger output during a respective burst noise event. In other examples, the duration count 74 can include associated time stamp values captured for the beginning and end of a given burst noise event, such as based on the trigger 68 signal. The duration output 74 can specify a burst duration for each burst noise event, such as mentioned above. Alternatively or additionally, the duration output 74 can include a cumulative burst noise duration (e.g., total accumulated time of burst noise) from a predefined start time, such as can be since power up or another reset event response to the duration reset input.

The burst logic 64 can also include an event counter 76 that is configured to provide an event count output 78 representing a number of discrete burst events. The event counter 76 can provide event count data 78 that can be stored in memory (e.g., memory 66). As an example, the event counter 76 can be configured to track an accumulated total number of burst noise events that occur in relation to a predefined event, such can be power up or a soft reset in response to an event reset input. For instance, a number of separate burst noise events can be determined (e.g., by a controller or processor or other logic) over a given period of time by subtracting a start count event count value and an end event count value for the respective period of time.

As a further example, each of the duration count 74, trigger output 68, time stamp 80, event count 78 and threshold values (e.g., corresponding to low and high hysteresis threshold levels) can also be written to the memory 66, corresponding to a burst data register, to record burst statistics and related information that may occur during operation of the burst detector 50. For instance, the corresponding time stamp (e.g., a system clock value) 70 can also be written to the memory (e.g., burst data register) 66. The time stamp can be utilized to correlate related burst statistics information to understand and characterize a burst event, such as for diagnostic purposes.

In some examples, the detected burst noise events can be categorized as low or high priority events depending on whether the burst noise event results in triggering the signal analyzer. For example, the burst noise events that result in triggering signal analysis can be considered high priority events and thus be stored in the memory 66 corresponding to a burst noise event report. In some cases, such as where another burst event occurs concurrently or sufficiently close in time to high priority event where, the bust detector 50 may be unable to capture all the information for another separate event, but nonetheless still may be able to detect the occurrence of the burst event. The detection of such other burst events can be recorded in the burst event count data 78.

As a further, the burst detector 50 can include a report generator 82 that is configured to generate a corresponding event report based on the information that is stored in the memory 66. As an example, the report generator 82 can generate a report in a data format that includes a header describing details associated with the number of high priority events and the number of low priority events as well as a transaction ID for tracking details associated with the report that is being generated. The report further can include payload data associated with each respective burst noise event that is being contained within the report. In some examples, each time a detected burst event ends, a report can be sent from the burst noise detector to a predetermined resource location, such as can include memory of the receiver or other predetermined resource location. Other triggers can be utilized for sending the report to the destination resource location. For each report, for example, data can specify event priority, the type of event, a minimum threshold, a maximum threshold, a time stamp for when the event began as well as a time stamp value when the event ended. The time stamp information can be utilized to determine the event duration as mentioned above. As a further example, additional information can be provided to determine the continuity of events such as to indicate if the burst noise events may be occurring at a rate that exceeds the ability to report the events. The report can include or include data (e.g., the timestamp data 80) that is sufficient to synchronize the burst statistics data with corresponding signal analysis data (e.g., generated by analyzer 18 of FIG. 1 or analyzer 100 of FIG. 3). The report generator 82 can be implemented as instructions executed by a central processing unit or other controller, such as can be implemented in a line card of a CMTS. In some examples, the number of burst noise events that can be provided into the register for reporting, for example may be further programmable.

Figure 3:
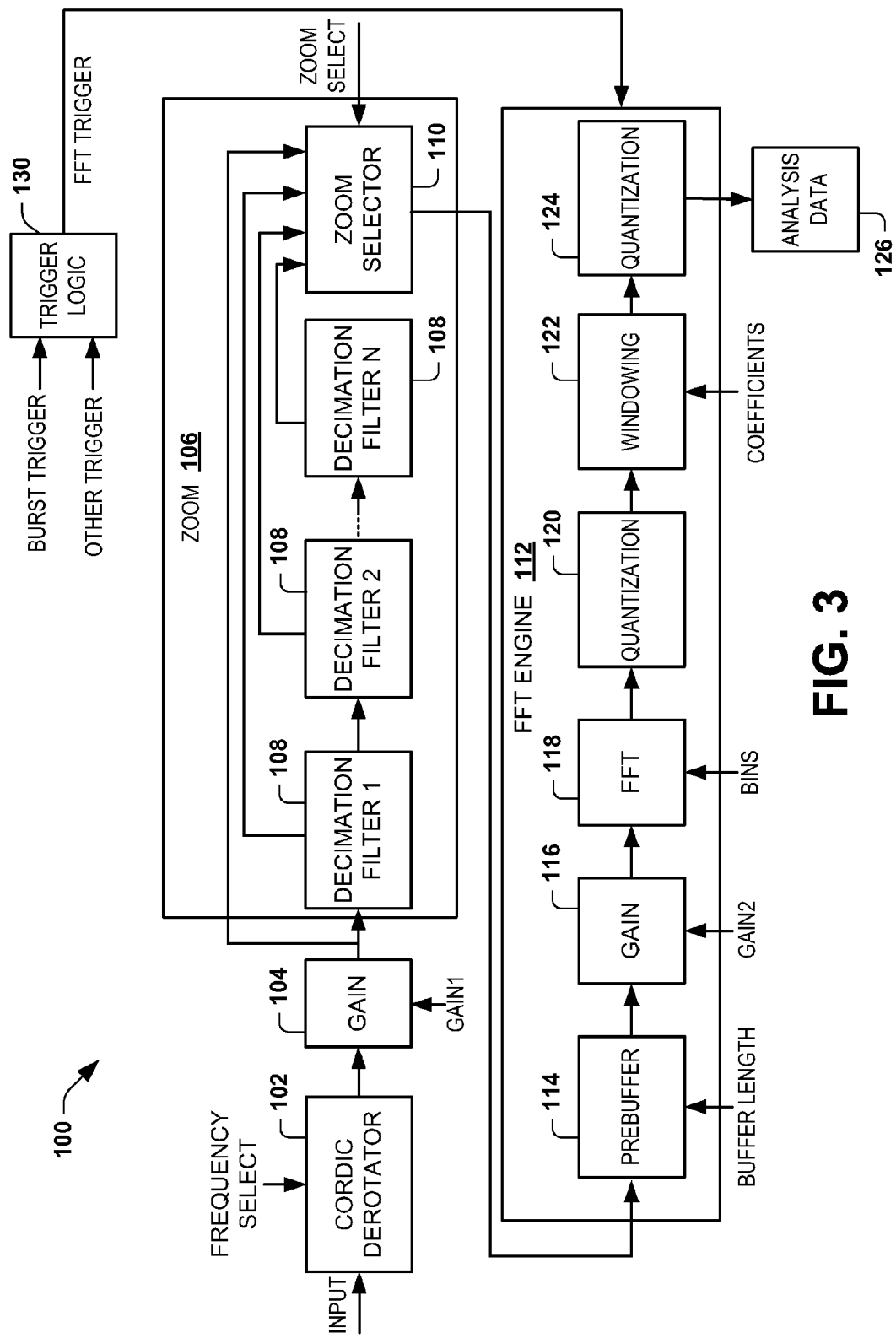
FIG. 3 depicts an example of a signal analyzer.

FIG. 3 depicts an example of a signal analyzer 100 that can be utilized to analyze signals in response to an FFT trigger signal. In the example of FIG. 3, the analyzer 100 includes a cordic derotator to down convert and tune the input signal to a corresponding narrowband region of the input signal spectrum. The selected frequency can be programmable and may be the same or different from the selected frequency to which the burst noise detector is tuned. The decimation filter can also be implemented within the cordic derotator 102. That is, each of the burst detector 50 and the signal analyzer 100 can implement independent tuners to facilitate finding a trigger in one selected part of the spectrum and use it to trigger analysis of another selected part of the spectrum, which can be independently selected from where the burst noise was detected. In other examples, the signal analyzer can be configured to tune to the same region of the signal spectrum where the burst noise was detected.

The selected narrowband spectrum can be provided to a digital gain block 104 to amplify the sampled and down converted signal spectrum to an appropriate level for subsequent processing. Such processing can include a zoom function 106 configured to implement a selectable zoom factor that is applied to the narrow band region of the signal spectrum. For example, the zoom function 106 can include a plurality of decimation filters 108 that can be configured to implement different levels of zoom. In the example of FIG. 3, there are N number of decimation filters, where N is a positive integer denoting the number of decimation filters and numbers of respective zoom levels. For example, where N equals 3, the zoom function 106 can implement three zoom levels (e.g., 2×, 4× and 8× zoom levels) as well as provide the raw input signal that can be selected for subsequent processing according to a zoom selector 110. The zoom selector can select one of the appropriate zoom levels or the raw narrow band input signal based on a zoom select signal, such as can be provided by a corresponding zoom select register programmed in memory of a receiver. The selected level of zoom and corresponding signal can be supplied to an FFT engine 112.

The FFT engine 112 can include a prebuffer 114 to buffer the input signal sufficient to facilitate capture and subsequent analysis that is pre-triggered. The pre-buffer can be configurable according to a buffer length value, which may be set depending upon application requirements. Thus the pre-buffer block affords a selectable buffer length so that a sufficient number of samples can be obtained and stored in the buffer prior to the trigger event to be processed through the FFT engine 112. The buffered output can be provided to a programmable gain block 116. The programmable gain block 116 can implement a programmable gain based on a gain value demonstrated as GAIN2. The amplified digital signal can in turn be provided to the core FFT function block 118.

The FFT function block 118 can be configured to compute a fast Fourier transform on the output of the gain block such as to provide a frequency domain characterization (e.g., a measurement of PSD) for the sampled narrowband region. In some examples, a delay line (not shown) can be utilized to frame the output of the gain block into sample sizes of a predetermined size for performing the FFT function. The FFT function 118 can have a programmable bin numbers (e.g., ranging from 256 to 8192). For example, the bin number can be set in response to a BIN input stored in a corresponding register (or other memory). In some examples, the bin numbers can be configured based on the burst data generated by the burst detector. For instance, the bin number can be set based on a duration of the burst noise event. For example, a burst noise event can range from 10 microseconds to a 100 microseconds, such as can be derived from burst noise detector counters or computed from time stamped values at the beginning and end of the respective burst noise events. The number of bins thus can be set to a level to accommodate the duration of the event and/or a level of zoom that has been selected.

A quantization block 120 quantizes the output of the FFT block such as can include a power spectrum density. A windowing component 122 can be configured to perform a windowing function on the quantized FFT output according to respective windowing coefficients such as can be stored in an appropriate register. The windowing component 122 can be programmable such as to implement different windowing functions such as Blackman-Harris windowing, Hann windowing or other known windowing protocols that can be established by defining the respective coefficients according to the desired window type. The windowing component 122 can perform such windowing as a circular convolution of the quantized FFT data with the frequency domain windowing coefficients, such as to re-order the FFT values and scale them according to the windowing coefficients via a quantization block 124 to provide corresponding analysis data 126. Such windowing is performed in the frequency domain to reduce the number of processing steps in contrast to what would be necessary if such windowing were performed in the time domain. Windowing coefficients can be set in response to a user input to implement a desired type of windowing. The corresponding frequency domain analysis data 126 can be stored in memory, such as a register or the like. For example, the analysis data 126 provided by the FFT engine 112 can be provided in packets of a predetermined word size to facilitate further processing and accumulation of the frequency domain analysis data 126.

As an example, the analysis data can be provided as an FFT data packet that includes a plurality of fields to describe different features associated with the temporal and frequency characteristics of the signal for a given burst noise event. In this way, both time domain and frequency domain characteristics associated with a given burst noise event can be monitored effectively. Examples of information that can be contained in a packet of the analysis data 126 can include a header, a unique transaction identifier, a time stamp associated with the data, center frequency for the analyze spectrum, the sampling frequency for the analyze spectrum, an indication of the source of the trigger. The FFT data packet can also include payload for each FFT bin including the real or magnitude data as well as imaginary of phase data determined by the FFT function 118.

In some examples, the FFT engine 112 can be a multi-purpose FFT such as can be selectively activated by the FFT trigger for one or more other purposes in addition to performing signal analysis in response to a burst trigger as disclosed herein. Examples of other purposes include pre-detection channel carrier-to-noise ratio (CNR) measurements, zoom measurements on frequency bands of interest, scanning of the upstream band for assisting in dynamic channel changes as well as sending the FFT data to an external resource for updated spectrum/time displays. For example, trigger logic 130 can be configured to generate the FFT trigger signal based on the burst trigger (e.g., provided by burst detector 12 or 50) and one or more other trigger signals. The trigger logic 130 can be configured to operate the signal analyzer, including the FFT engine, in various triggering modes in addition to the burst trigger. For example, the trigger logic 130 can operate to trigger the FFT engine 112 in the following modes: in response to a non-burst trigger (e.g., trigger in the absence of burst noise), in response to detecting a service identifier (SID) of a given cable modem, or a free run mode in which the FFT engine provides FFT data continuously. Additionally, the signal analyzer and FFT engine 112 can be triggered for use with a plurality of burst receivers further increasing the efficiency of the approach disclosed herein. The control of the mode and thus the trigger basis can be provided in response to a user input or it may be provided by automated means (e.g., an application).

Figure 4:
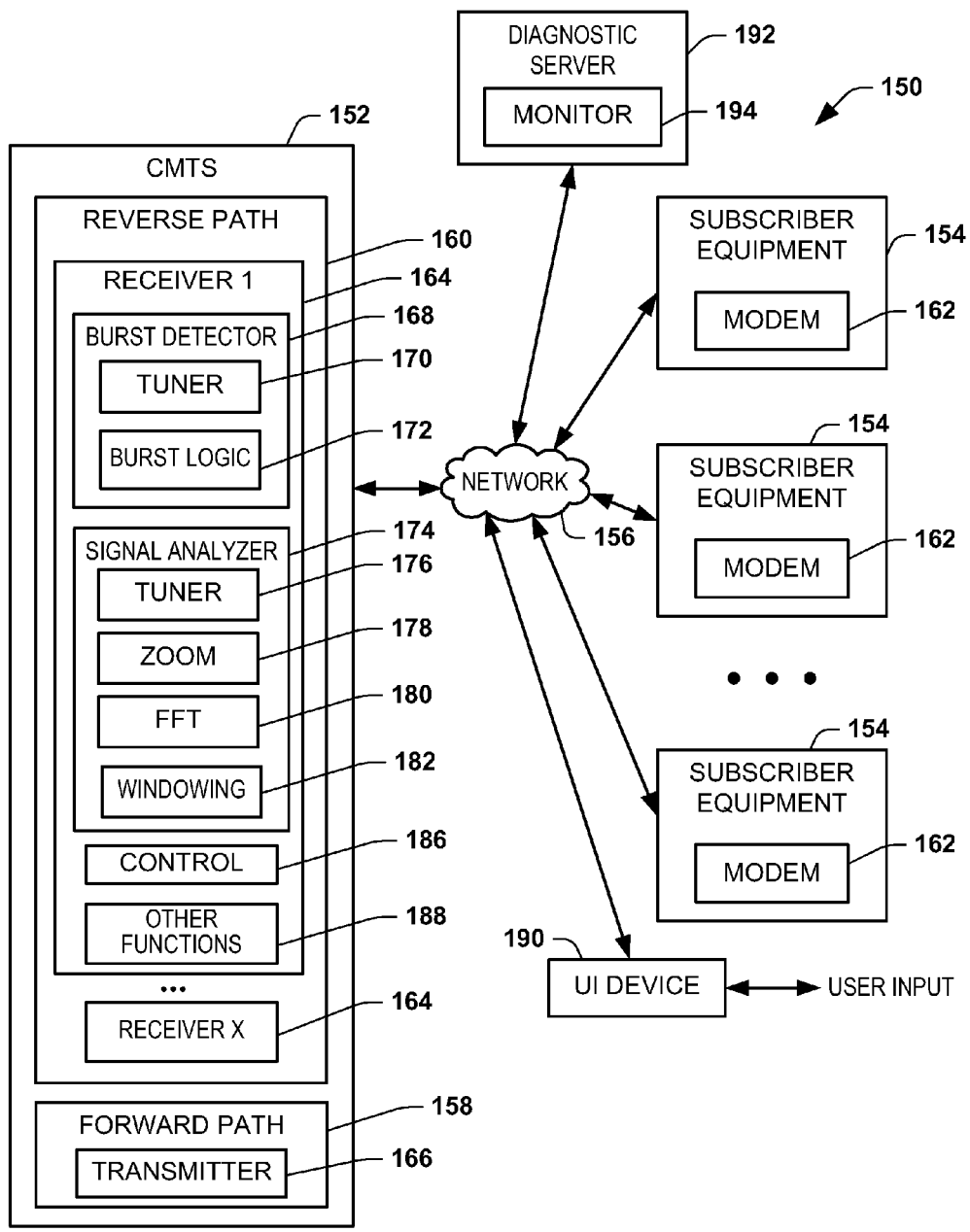
FIG. 4 depicts an example of a system to facilitate analysis and evaluation of signals in a communications network.

FIG. 4 depicts an example of part of a cable system 150 that can implement signal analysis in response to burst detection, such as disclosed herein. The system 150 can include a cable modem termination system (CMTS) 152, such as can be implemented at a headend of a cable plant. The CMTS 152 can communicate information with subscriber equipment (e.g., consumer premises equipment (CPE)) 154 via a network 156. The network 156 can include physical (e.g., optical and electrically conductive) connections and/or wireless links (e.g., cellular, WLAN, WMAN, WiMax or the like) extending between the subscriber equipment 154 and the CMTS 152. For example, the network 156 can be a cable network that communicates electrical signals over a coaxial cable or a hybrid-fiber coaxial (HFC) network that communicates a combination of optical and electrical signals. As mentioned, the network 156 further may employ wireless communications.

The CMTS 152 can communicate with the subscriber equipment 154 using reverse path electronics 160 and forward path electronics 158. For example, each of the subscriber equipment 154 can include one or more modems 162 configured to send data upstream via the network 156 to the reverse path electronics 160. The modems 162 can also receive data sent downstream via the network 156 from the forward path electronics 158. That is, the reverse path electronics 160 can include a receiver 164 and the forward path electronics 158 can include a transmitter 166 configured to respectively receive and send data according to a predetermined communications protocol, such as DOCSIS.

As a further example, the receiver 164 can be configured to demodulate reverse path signals transmitted by one or more of the modems 162. The receiver 164 can include a burst detector be configured to detect a narrowband impulse signal. The burst detector 168 can be configured as disclosed with respect to the burst detector 12 of FIG. 1 or the detector 50 of FIG. 2.

Briefly, the burst detector 168 can include a tuner 170 configured to tune to narrowband of the input frequency band such as a digital baseband input spectrum (e.g., a ranging from about 5 MHz to about 85 MHz). For example, the tuner 170 can include a cordic derotator and a decimation block to provide samples for monitoring power in the selected narrowband. Logic 172 can be configured to detect the occurrence of a burst condition with the narrowband as well as to capture statistics and other information related to the detected burst condition. The logic and the tuner can be programmable to selectively control where in the spectrum the burst will be detected as well as set one or more thresholds for detecting impulse power levels sufficient to provide a corresponding burst trigger, such as disclosed herein. The burst detector 168 can provide the trigger and related information (e.g., burst statistics) to a register in memory of the receiver for subsequent processing.

Additionally, the trigger generated by the burst detector can be provided to control signal analysis, such as by a signal analyzer 174. The signal analyzer 174 can be configured as disclosed with respect to the analyzer 18 of FIG. 1 or the signal analyzer 100 of FIG. 3. The signal analyzer 174 can be configured to time correlate the measured signal information with at least one burst event based on the trigger signal, such that the burst information and resulting signal analysis information can be time correlated relative to the burst event. In the simplified example of FIG. 4, the signal analyzer 174 includes a tuner 176, a zoom function 178, an FFT core function 180 and a windowing component 182. Each of the signal analyzer and the components 174, 176, 180 and 182 can be configured as disclosed with respect to the signal analyzer 100 of FIG. 3.

As an example, the tuner 176 can tune to a selected narrowband portion of the input spectrum, which can be different from or the same as the narrowband portion to which the burst detector 168 tunes. The zoom function 178 can be configured to implement different zoom levels on the selected narrowband signal. The FFT core 180 can compute an estimate of a FFT on the zoomed signal, while maintaining a bin spacing for the selected zoom level, to quantify signal characteristics for the selected narrowband frequency spectrum. The FFT core 180 further can include programmable bin numbers, such as can be selected according to the duration data for a given burst noise event. The windowing component 182 can be configured to perform circular convolution of quantized FFT frequency domain data according to windowing coefficients and scaled to provide the resulting signal analysis data. The signal analysis data can be stored in memory with identifying information, such as disclosed herein to facilitate subsequent analysis of the burst data and the corresponding signal analysis data.

The receiver 164 can also include a control 186 and one or more other functions 188. The control 186 can be configured to program operating parameters of the burst detector 168 and the signal analyzer 174, such as those parameters disclosed herein. In some examples, the control 186 can expose a user interface that is accessible to program the operating parameters in response to a user input, such as provided by a user input device 190. The user input device 190 can be connected to the control 186 via the network 156 and be configured to communicate data over the network 156 with the control 186, such as using a data interchange mechanism like javascript object notation (JSON) or XML. The user input device 190 can be a computer, such as a tablet computer, notebook computer, smart phone or other network-ready appliance that can access the control 186 via the network 156.

By way of example, a user can employ the user input device 190 access a user interface of the control 186 (e.g., at a specified URL). The user input device 190 can provide instructions to set operating parameters (e.g., tuning parameters for the burst detector and/or signal analyzer, burst threshold(s), trigger mode and the like). Additionally, the control 186 can generate one or more reports that describe computed burst information (e.g., provided by the burst detector 168) and related signal analysis information (from the signal analyzer 174). For example, the signal analyzer 174 can be configured to provide signal analysis data in packets and a report generator function of the control 186 can construct a report based on the signal analysis and burst data. The report can be accessed by the user input device 190 (e.g., as a web-based report).

As another example, the signal analysis data and burst data can be provided to a diagnostic server 192 that can store the data for subsequent analysis. The content of the data can vary depending on the configuration of the burst detection and signal analysis implemented by the burst detector 168 and the signal analyzer 174, respectively. The diagnostic server 192 can be accessed via the network 156 from the user input device 190. For example, the diagnostic server 192 can include a monitor function 194 that can be programmed to analyze the burst data and signal analysis data over time, and which may include a plurality of different frequency spectrums. The monitor function 194 can also present specific information (e.g., for a given narrowband spectrum for a specified period of time in response to a user input via the user input device 190, for example. The monitor function 194 further can generate a corresponding report the report can be in the form of a document that is provided to a predetermined URL (e.g., as a hypertext document). The report can be interactive and facilitate diagnostics related to various aspects of the cable system 150, such as to provide a temporal and frequency domain view of signals being communicated in the system. A user further can employ the user input device 190 to set other operating parameters for one or more of the modems 162, the reverse path electronics and/or forward path electronics based on the information provided in the report.

The other functions 188 can include other monitoring or calculation functions that can be programmed to compute or capture information associated with input signals received by the receiver. In some examples, the other functions 188 can provide one or more other trigger signals to activate the signal analyzer 174 for signal analysis that is unrelated to a burst event that can be detected by the burst detector 168. Thus, the other functions 188 and the burst detector 168 can share the functionality provided by the signal analyzer and, in particular, the FFT block 180, which usage can be managed by logic implemented by the control 186, for example.

The CMTS 152 can include one or more receivers 164 in the reverse path electronics 160, demonstrated as receiver 1 through receiver X where X is a positive integer denoting the number of receivers. Each receiver 164 can be similarly configured to receive reverse path signals from respective cable modems 162, such as disclosed herein. In some examples, each receiver can include a respective a burst detector 168. Additionally, each of the receivers 164 can share a multi-purpose signal analyzer (the analyzer 174). Thus, while in the example of FIG. 4, the signal analyzer 174 is shown within Receiver 1 164, it could be part of the reverse path electronics 160 (implemented in a line card) coupled to and shared by each of the receivers 164. In other examples, each receiver 164 could include its own signal analyzer.

The combination of burst detection and signal analysis as disclosed herein enables a temporal and frequency domain view of a given impairment. As a result, a user (or application) can develop possible mitigation strategies based on the signal analysis results (e.g., PSD characteristics). For example, such a strategy can utilize null scheduling times based on predicting the burst noise events by way of measured periodicity. Additionally or alternatively, a strategy can provide for setting a operating parameters for the system 150, such as may include moving the carrier frequencies to adequate carrier to noise (CNR) regions as well as changing FEC, modulation density, channel bandwidth, and even access technology (e.g., ATDMA versus sCDMA). Thus by accurately specifying burst noise events, especially in the lower end of the frequency spectrum, strategies can be more effectively implemented to increase bandwidth usage in the available spectrum.

Figure 5:
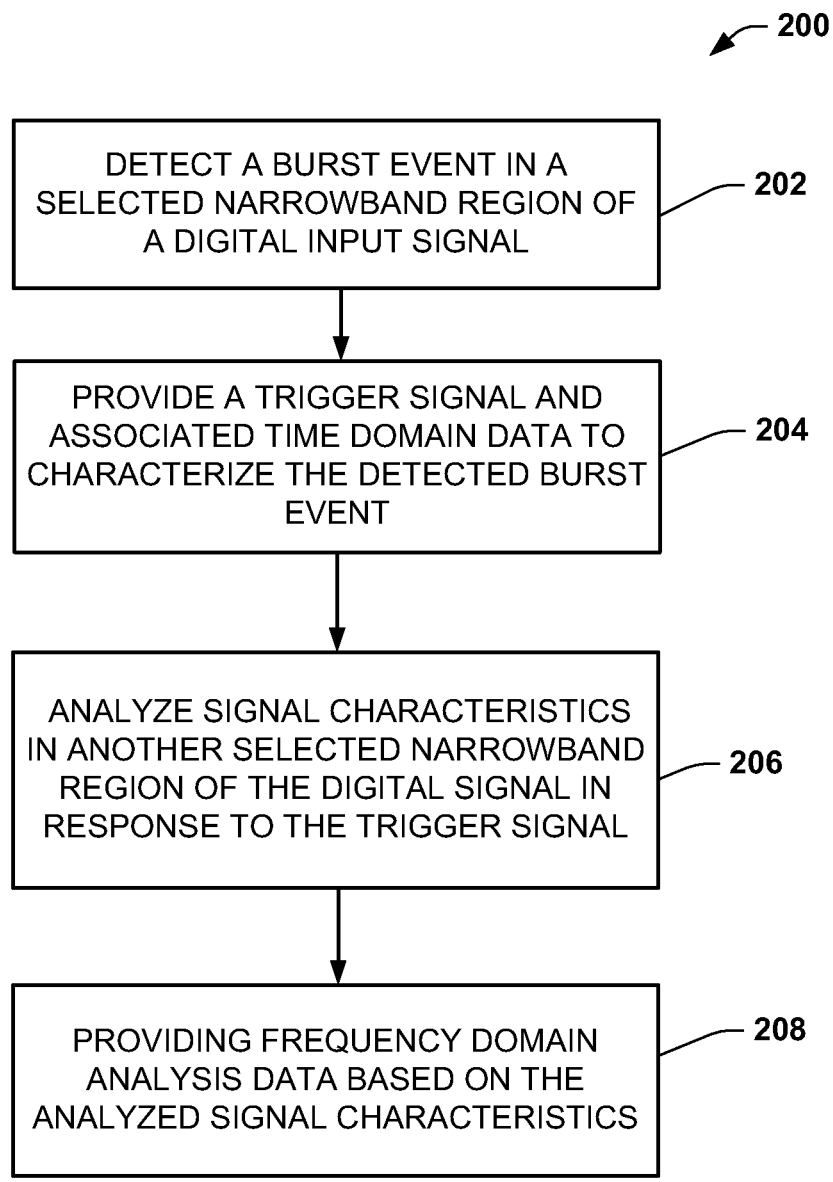
FIG. 5 is a flow diagram demonstrating an example method to trigger signal analysis.

In view of the foregoing examples, a method of processing signals will be appreciated with reference to FIG. 5. While, for purposes of simplicity of explanation, the example method 200 of FIG. 5 is shown and described as executing serially, the present examples are not limited by the illustrated order, as some actions could in other examples occur in different orders and/or concurrently from that shown and described herein. Moreover, it is not necessary that all disclosed actions be performed to implement a method. The method can be implemented as hardware (e.g., a field programmable gate array (FPGA) or an application specific integrated circuit (ASIC)) or as instructions that can be stored in memory and executed by one or more processors (e.g., a digital signal processor), or as a combination of hardware and software components. As one example, the method can be implemented by components (e.g., hardware and/or software components) residing in a receiver within a cable television system.

The method 200 of FIG. 5 begins at 202 in which a burst event in a first selected narrowband region of a digital input signal is detected (e.g., by burst detector 12 of FIG. 1 or 50 of FIG. 2). The burst event can correspond to burst noise in a selected narrowband region of a digital input signal, such as a reverse path signal from a cable modem. The selected narrowband region can be specified based on identified one or more impaired frequency (e.g., by the interference monitor 53 of FIG. 2). At 204, a trigger signal can be generated based on the detection of the burst event burst event. For example, the trigger signal can be provided based on comparing an indication of power for the selected narrowband region relative to a programmable threshold (e.g., by comparator 70 of FIG. 2). Additional logic can by implemented to provide other burst-related time domain information, such as can include an indication of the number of burst events and/or an indication of duration for a given burst event (e.g., implemented by event counter 76 and/or duration counter 72 of FIG. 2). For example, the duration information can be utilized to facilitate detecting the burst event in the presence of high static background noise as well as to help shape corresponding signal analysis, as disclosed herein.

At 206, the method 200 can also include analyzing signal characteristics in a selected narrowband region of interest in the digital signal in response to the trigger signal. The analysis can include frequency domain analysis of the narrowband of interest. The analysis can be performed on a region of the signal that can be independent from the region where the burst event is detected, which may be the same or different region. At 208, frequency domain analysis data can be provided based on the analyzed signal characteristics. For example, the frequency domain analysis can include performing an FFT (e.g., FFT function 118 of FIG. 3) to provide FFT data. Windowing and quantization may be performed on the FFT data in the frequency domain to remove unwanted information from the FFT based data (e.g., by windowing component 122 and quantization component 124). Prior to performing FFT on the narrowband region of interest, the method can include zooming into the selected narrowband region of the input signal (e.g., zoom function 106) with one of a plurality of zoom levels (proportion to the Nyquist frequency) that can be set based on zoom selection. The zoom can be implemented on a time domain version of the signal to provide a focused portion of the signal of interest while maintaining a bin spacing over different zoom levels to facilitate FFT processing. The parameters of the burst detection and signal analysis further can be programmable as disclosed herein.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus comprising:
   a burst detector configured to provide a time domain analysis, the burst detector comprising a first tuner, an interference detector, and a burst logic, wherein:
   the first tuner is configured to tune the burst detector to a spectrum of a digital input signal;
   the interference detector is configured to:
     determine at least one frequency region in the spectrum of the digital input signal that is impaired, and
     provide a frequency select signal corresponding to a selected frequency within the at least one frequency region;
   the burst detector logic is configured to:
     detect, based on a first threshold, a burst event for the selected frequency of the digital input signal having a predetermined bandwidth,
     generate a burst trigger, in response to comparing the burst event to a second threshold, and
     generate the time domain analysis of the selected frequency, the time domain analysis comprising the first threshold, the second threshold, and a duration of the burst event; and
   a signal analyzer configure to provide a frequency domain analysis of the selected frequency, the signal analyzer comprising a second tuner, a programmable zoom selector, and a fast Fourier transform (FFT) engine, wherein:
     the second tuner is configured to tune, in response to receiving the trigger from the burst logic, to a portion of the selected frequency,
     the programmable zoom selector configured to zoom on the portion of the selected frequency at a programmed zoom level, wherein the programmable zoom selector comprises a plurality of decimation filters, each of the plurality of decimation filters denoting a zoom level, and
     FFT engine configured to compute a FFT for the zoomed portion of the selected frequency and provide a frequency domain characterization the zoomed portion based on the computed FFT.

2. The apparatus of claim 1, wherein the signal analyzer time correlates the measured signal information with at least one burst event based on the burst trigger, such that the burst trigger, the other burst data and the corresponding analysis data are time correlated relative to the at least one burst event.

3. The apparatus of claim 1, wherein the first tuner is further configured to down convert and sample the digital input signal at the selected frequency to enable the burst detector to detect burst noise in a narrowband region of the digital input signal; and wherein the second tuner is further configured to tune to the another selected frequency independently of the selected frequency to which the burst detector is tuned.

4. The apparatus of claim 3, wherein the first tuner of the burst detector is configured to tune the selected frequency to the at least one frequency region based on the frequency select signal.

5. The apparatus of claim 1, wherein the burst detector further comprises a comparator to compare signal power at the selected frequency relative to the first threshold to determine a presence or absence of the burst event at the selected frequency based on the comparison, the burst trigger being set to a value to cause the signal analyzer to provide the frequency domain analysis that is time correlated to the burst event.

6. The apparatus of claim 5, wherein the comparator comprises a hysteresis comparator configured to provide the burst trigger based on comparing an indication of the signal power at the selected frequency relative to the first and second thresholds, the first and second thresholds being set to control a signal power level that is sufficient to correspond to the burst event.

7. The apparatus of claim 5, wherein the burst detector further comprises a burst event counter configured to provide an event count indicative of a number of detected burst events based on an output of the comparator and, the event count being included in the other burst data.

8. The apparatus of claim 7, wherein the burst detector further comprises a burst noise duration counter configured to measure the duration of the burst event and provide an output indicative of the duration of the burst event to facilitate detecting the burst event in the presence of high static background noise.

9. The apparatus of claim 1, wherein the FFT engine is further configured to quantify signal characteristics for an another selected frequency of the digital input signal in response to the burst trigger.

10. The apparatus of claim 1, wherein the programmable zoom is further configured to focus into a frequency spectrum of the digital input signal with different zoom levels based on zoom selection input while maintaining a bin spacing for the different zoom levels.

11. The apparatus of claim 1, wherein the FFT engine comprises a programmable bin number selected according to the duration data for a given burst event.

12. The apparatus of claim 9, wherein the another selected frequency of the digital input signal comprises a spectral region of the digital input signal that is independent from the selected frequency for the burst detector.

13. The apparatus of claim 9, wherein the FFT engine further comprises a windowing function configured to perform circular convolution of quantized FFT frequency domain data according to windowing coefficients and to provide the corresponding analysis data.

14. The apparatus of claim 1, wherein the time domain analysis data and the frequency domain analysis data for a given burst event are sent to a predetermined resource location on a network.

15. A method comprising:
determining at least one frequency region in a spectrum of a digital input signal that is impaired;
providing a frequency select signal corresponding to a selected frequency within the at least one frequency region;
detecting, based on the frequency select signal and a first threshold, a burst event in a first selected narrowband region of the digital input signal;
providing a trigger signal corresponding to the detected burst event based on a second threshold;
generating an associated time domain data to characterize the detected burst event based on the detection of the burst event, the time domain data comprising the first threshold and the second threshold;
tuning, in response to the trigger signal a spectrum analyzer to a narrowband region of the selected frequency;
zooming by a programmable zoom selector on a portion of the narrowband region at a programmed zoom level;
performing a frequency domain analysis on the zoomed portion of the narrowband region of the selected frequency, wherein performing the frequency domain analysis comprising computing a fast Fourier transform (FFT) for the zoomed portion of the selected frequency; and
providing frequency domain analysis data based on the computed FFT.

16. The method of claim 15, further comprising:
generating an event count based on counting a number of detected burst events in the narrowband region of the digital input signal; and
providing an output indicative of a duration of at least one given burst event to facilitate detecting the burst event in the presence of high static background noise, the event count and the output indicative of the duration of the given burst event being included in the associated time domain data.

17. The method of claim 15, wherein zooming comprises zooming into the narrowband region of the digital input signal with one of a plurality of zoom levels set based on zoom selection input, a bin spacing of the narrowband region of the digital input signal that is analyzed being maintained for each of the plurality of zoom levels.

18. The method of claim 15, wherein the associated time domain data comprises duration data indicative of a duration of the detected burst event, and wherein the analyzing further comprises:
selecting a programmable bin number for the fast Fourier transform according to the duration for a given burst event.

19. The method of claim 18, wherein performing the FFT further comprises:
performing circular convolution of the FFT according to windowing coefficients to provide windowed frequency domain analysis data; and
scaling the windowed frequency domain analysis data to provide the frequency domain analysis data.

20. A system comprising:
reverse path electronics comprising:
a receiver configured to receive a reverse-path burst-mode digital communication signal from at least one downstream modem, the receiver comprising a burst detector configured to provide time domain burst noise data and a signal analyzer configured to provide a frequency domain burst noise data in response to detecting a burst noise event in a selected frequency region of a reverse path signal, wherein the burst detector comprises a first tuner, an interference detector, and a burst logic, wherein:
the first tuner is configured to tune the burst detector to at least one frequency region in a spectrum of a digital input signal,
the interference detector is configured to determine at least one frequency region in a digital spectrum of a digital input signal that is impaired and provide a frequency select signal corresponding to the a selected frequency within the at least one frequency region,
the burst logic configured to:
detect, based on a first threshold, a burst event for the selected frequency of the digital input signal,
generate a burst trigger, in response to comparing the burst event to a second threshold, and
generate a time domain analysis of the selected frequency, the time domain analysis comprising the first threshold, the second threshold, and a duration of the burst event; and
wherein the signal analyzer comprises a second tuner, a programmable zoom selector and a fast Fourier transform (FFT) engine, wherein
the second tuner is configured to tune, in response to receiving the trigger from the burst logic, to a portion of the selected frequency,
the programmable zoom selector comprises a plurality of decimation filters, each of the plurality of decimation filters denoting a zoom level, wherein the programmable zoom selector configured to zoom on the portion of the selected frequency at a programmed zoom level, and
FFT engine configured to compute a FFT for the zoomed portion of the selected frequency to provide a frequency domain characterization the zoomed portion.

* * * * *